(12) United States Patent
Westendorf et al.

(10) Patent No.: US 7,152,903 B2
(45) Date of Patent: Dec. 26, 2006

(54) TRACTOR, A CANOPY ASSEMBLY, AND A METHOD FOR ATTACHING A CANOPY ASSEMBLY TO A TRACTOR

(75) Inventors: Matthew N. Westendorf, Onawa, IA (US); Myron J. Kellen, Onawa, IA (US); Neal W. Westendorf, Dakota Dunes, SD (US)

(73) Assignee: Westendorf Manufacturing Co., Inc., Onawa, IA (US)

( * ) Notice: Subject to any disclaimer, the term of this patent is extended or adjusted under 35 U.S.C. 154(b) by 0 days.

(21) Appl. No.: 10/769,558

(22) Filed: Jan. 30, 2004

(65) Prior Publication Data

US 2005/0168007 A1   Aug. 4, 2005

(51) Int. Cl.
   *B62D 25/06* (2006.01)

(52) U.S. Cl. ............... 296/102; 296/190.03; 296/210; 296/107.17

(58) Field of Classification Search ............... 296/102, 296/210, 190.03, 190.08, 107.17, 216.02; 135/88.03, 88.09; D15/17; 280/756; 180/89.12
See application file for complete search history.

(56) References Cited

U.S. PATENT DOCUMENTS

| | | | | |
|---|---|---|---|---|
| 3,205,003 A | * | 9/1965 | Jensen | 296/102 |
| 3,455,598 A | * | 7/1969 | Edman et al. | 296/102 |
| 3,656,803 A | * | 4/1972 | Brown et al. | 296/102 |
| 3,712,664 A | * | 1/1973 | May | 296/102 |
| 4,159,835 A | * | 7/1979 | Leja et al. | 280/756 |
| 4,376,550 A | | 3/1983 | Strauss | |
| 4,949,991 A | | 8/1990 | Ludwig | |
| 5,042,835 A | | 8/1991 | Burns | |
| 5,094,500 A | | 3/1992 | Maypole et al. | |
| D365,351 S | | 12/1995 | Schroyer | |
| 5,503,430 A | | 4/1996 | Miki et al. | |
| 5,842,732 A | | 12/1998 | Daggett et al. | |
| 5,882,063 A | | 3/1999 | Job | |
| D408,038 S | | 4/1999 | Lollis, Jr. | |
| 5,961,175 A | | 10/1999 | Clardy, Jr. | |
| 6,186,584 B1 | * | 2/2001 | Samuelson et al. | 296/213 |
| 6,189,955 B1 | | 2/2001 | Fryk et al. | |
| 6,471,280 B1 | | 10/2002 | Fowler | |
| 2002/0175534 A1 | * | 11/2002 | Strong | 296/77.1 |
| 2005/0073169 A1 | | 4/2005 | Kamerer | |

OTHER PUBLICATIONS

Progressive Farmer, Jul. 1992. Big Top Aluminum Canopies.

* cited by examiner

*Primary Examiner*—Stephen Gordon
(74) *Attorney, Agent, or Firm*—Merchant & Gould, P.A.

(57) ABSTRACT

The invention relates to a canopy assembly for use on a tractor that can be conveniently installed and removed by a single operator. The canopy assembly includes, among other things, a sun shield, a bracket assembly, and attachment arms. Installing the sun shield includes the step of attaching a pair of attachment arms to a pair of bracket mounting arms that are mounted to a tractor.

15 Claims, 10 Drawing Sheets

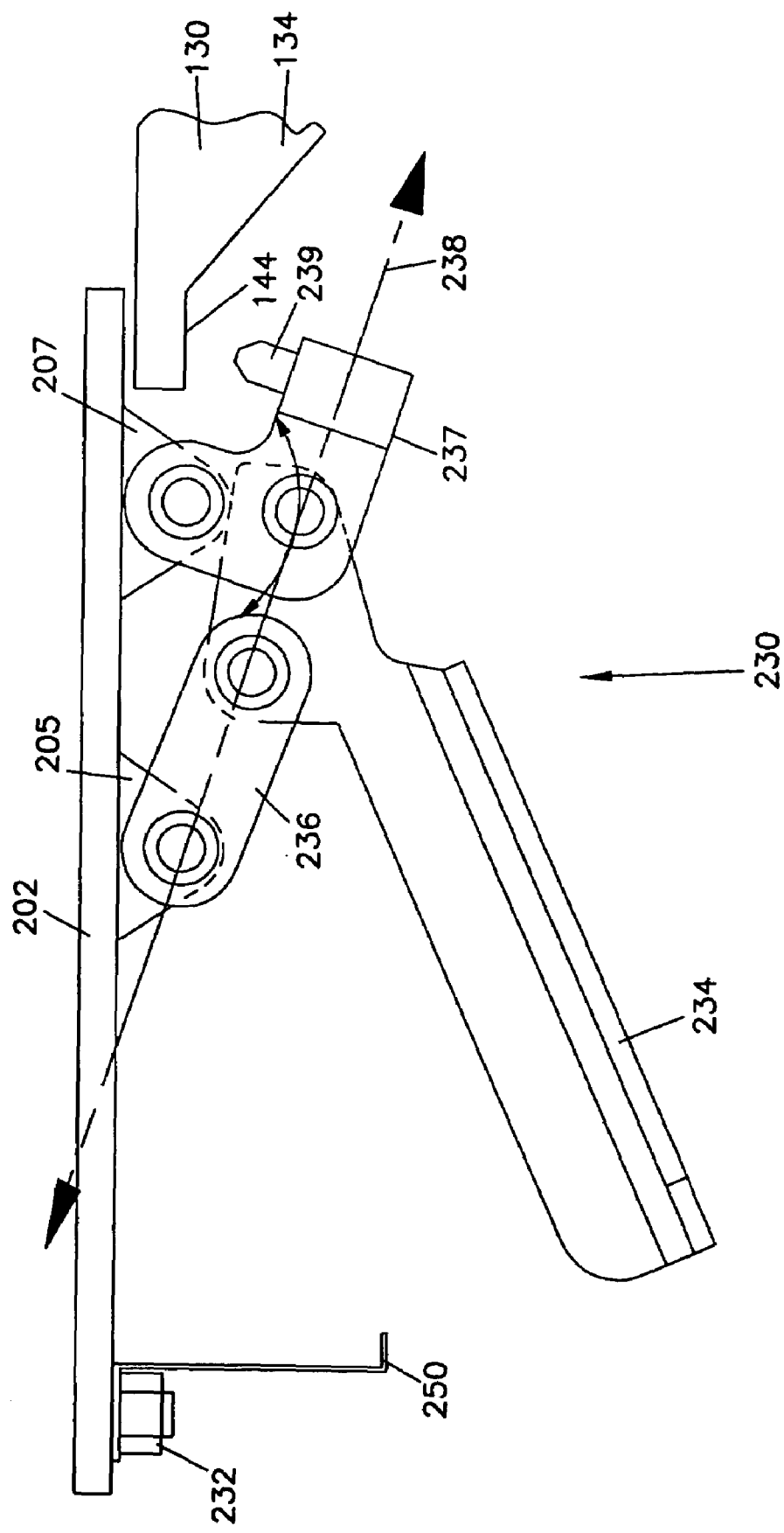

TRACTOR, A CANOPY ASSEMBLY, AND A METHOD FOR ATTACHING A CANOPY ASSEMBLY TO A TRACTOR

FIELD OF THE INVENTION

The present invention relates to a tractor, a canopy assembly, and a method for attaching the two. The tractor canopy assembly is constructed to securely hold a sun shield on a tractor and allow for quick and easy installation and removal thereof.

BACKGROUND OF THE INVENTION

Modern tractors are usually equipped with a rollover protection system ("ROPS") that includes a rollover protection bar, which surrounds the operator's position and protects the operator in the event of a rollover. Commonly, the rollover protection bar is hinged so that it can be folded over to minimize the tractor's overall height. Exemplary rollover protection bars are described by U.S. Pat. No. 5,042,835 to Burns, U.S. Pat. No. 5,503,430 to Miki et al., and U.S. Pat. No. 4,949,991 to Ludwig.

It is common practice to incorporate a canopy (sun shield) with the rollover protection bar to protect the operator from the elements. Traditional tractor canopies are heavy and awkward; therefore, installation and removal thereof can be time consuming and difficult. An exemplary tractor canopy is described by U.S. Pat. No. 5,882,063 to Job.

SUMMARY OF THE INVENTION

A canopy assembly for use on a tractor is provided according to the invention. The canopy assembly includes a sun shield, a bracket assembly, and attachment arms.

The sun shield is a structure that is adapted to protect the tractor operator from the elements. In some embodiments the sun shield is constructed of fiberglass or opaque plastic so that it is both waterproof and sun proof.

The bracket assembly is constructed for attachment to a rollover protection bar of a tractor. The bracket assembly includes at least two bracket mounting arms and a bracket mounting plate extending therebetween. The bracket assembly further includes at least one bracket catch constructed for attachment to a bracket mounting arm of the bracket assembly. The bracket catch is designed to engage and support attachment arms thereby facilitating installation and removal of the sun shield.

In some embodiments the canopy assembly includes two attachment arms. The attachment arms can be attached to the underside of the sun shield such that, when the canopy is installed, the sun shield is positioned over the operatior's position. At least one of the attachment arms can include a sun shield arm, an engaging member, and a lock assembly. The engaging member is mounted on an attachment arm and is adapted to engage the bracket assembly and support one end of the attachment arm during installation and removal of the sun shield. The attachment lock assembly is constructed to mount to an attachment arm and is adapted to secure the attachment arm onto a bracket mounting arm of the above-referenced bracket assembly.

A method of attaching a canopy to a tractor is also provided according to the invention. The method includes attaching a pair of attachment arms to a pair of bracket mounting arms that are mounted on a rollover protection bar. Since the attachment arms are connected to a sun shield, attaching the attachment arms to the bracket assembly thereby attaches the sun shield to the rollover protection bar.

BRIEF DESCRIPTION OF THE DRAWINGS

FIG. 5b is a side view of the over-center locking mechanism of FIG. 3 shown in an unlocked position.

DETAILED DESCRIPTION OF THE PREFERRED EMBODIMENT

Figure 1:
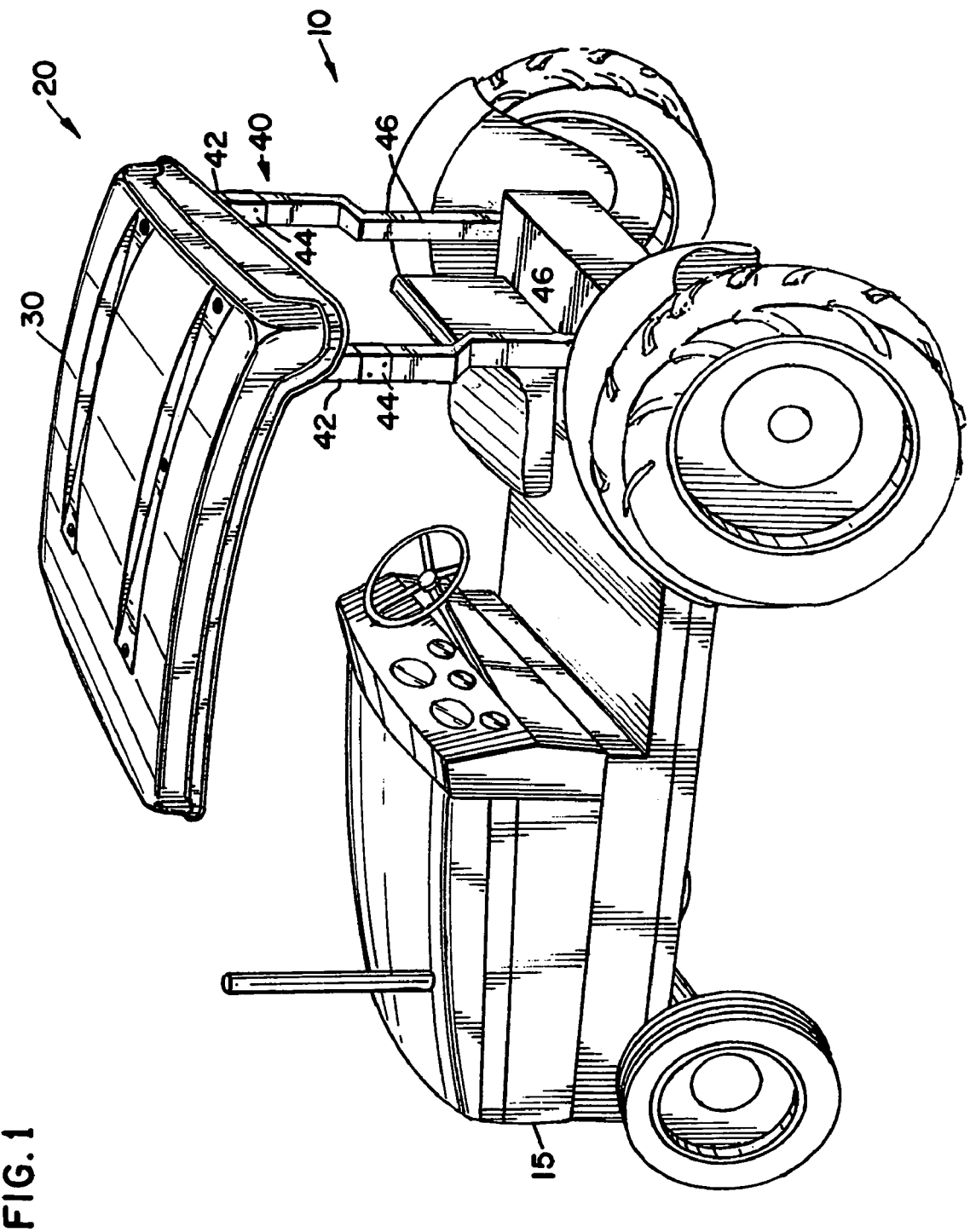
FIG. 1 is a perspective view of the canopy assembly mounted on a tractor according to the principles of the invention.
Figure 4:
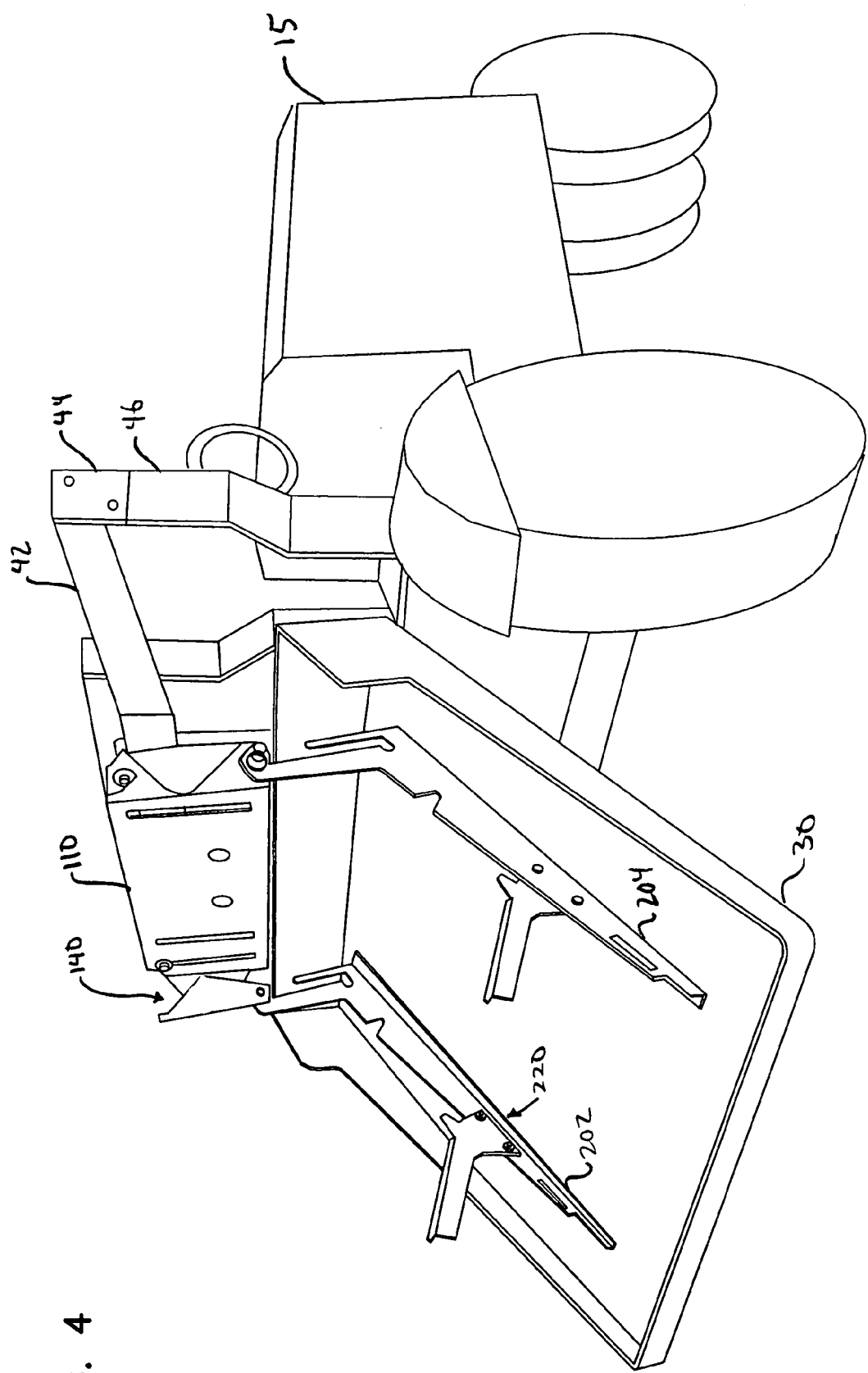
FIG. 4 is diagrammatic perspective view of the canopy assembly positioned for installation onto a rollover protection bar.
Figure 5A:
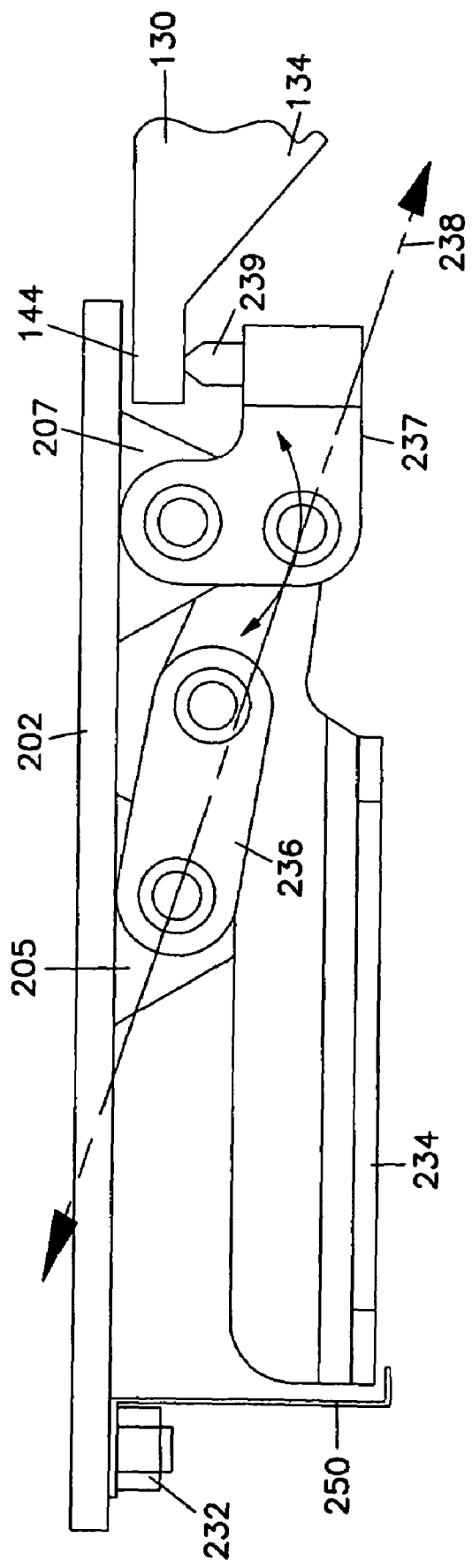
FIG. 5a is a side view of the over-center locking mechanism of FIG. 3 shown in a locked position.

Referring to FIG. 1, a canopy assembly according to the invention is shown at reference numeral 20. The canopy assembly 20 is provided attached to a rollover protection bar 40 of a tractor 15. One advantage of the present invention is that the sun shield 30 of the canopy assembly 20 can be quickly and easily attached and detached from the rollover protection bar 40. The rollover protection bar 40 shown in FIGS. 1 and 4 is foldable and includes an upper portion 42, a hinge 44, and a lower portion 46. However, it should be appreciated that while the canopy assembly 20 can be attached to a foldable rollover protection bar 40 on a tractor 15, the canopy assembly 20 can also be attached to rollover protection bars that do not fold. In addition, it should be appreciated that the canopy assembly can be mounted on vehicles other than tractors.

Now referring to FIGS. 2–6, the canopy assembly is shown in more detail. The canopy assembly 20 includes: a bracket assembly 100 shown in FIGS. 2, 4, and 6; a sun shield and attachment arms shown in FIGS. 3 and 4; and an attachment lock assembly shown in FIGS. 3, 4, 5a, and 5b.

Figure 2:
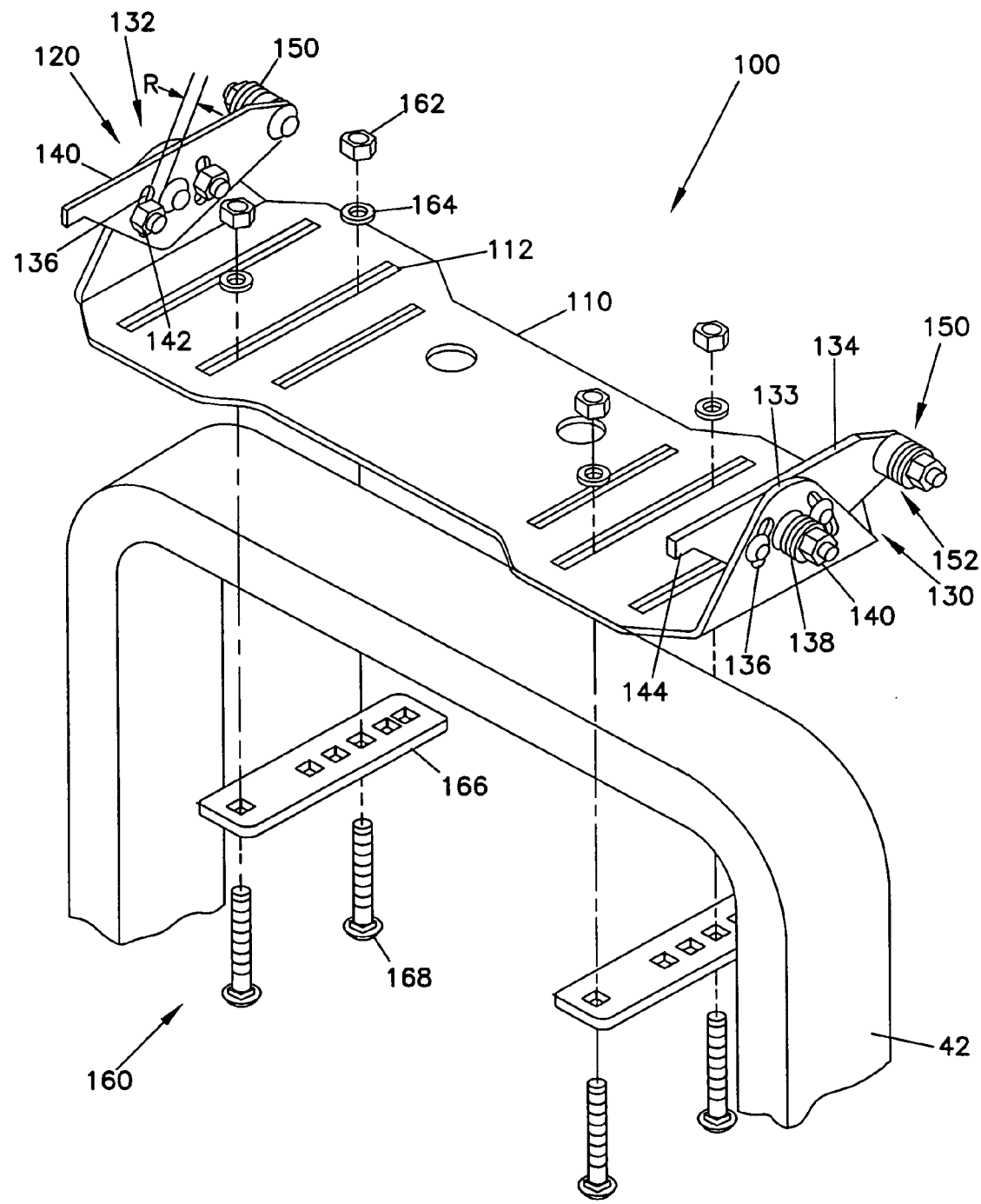
FIG. 2 is a perspective view of the bracket assembly of the canopy assembly and the rollover protection bar of FIG. 1.
Figure 3:
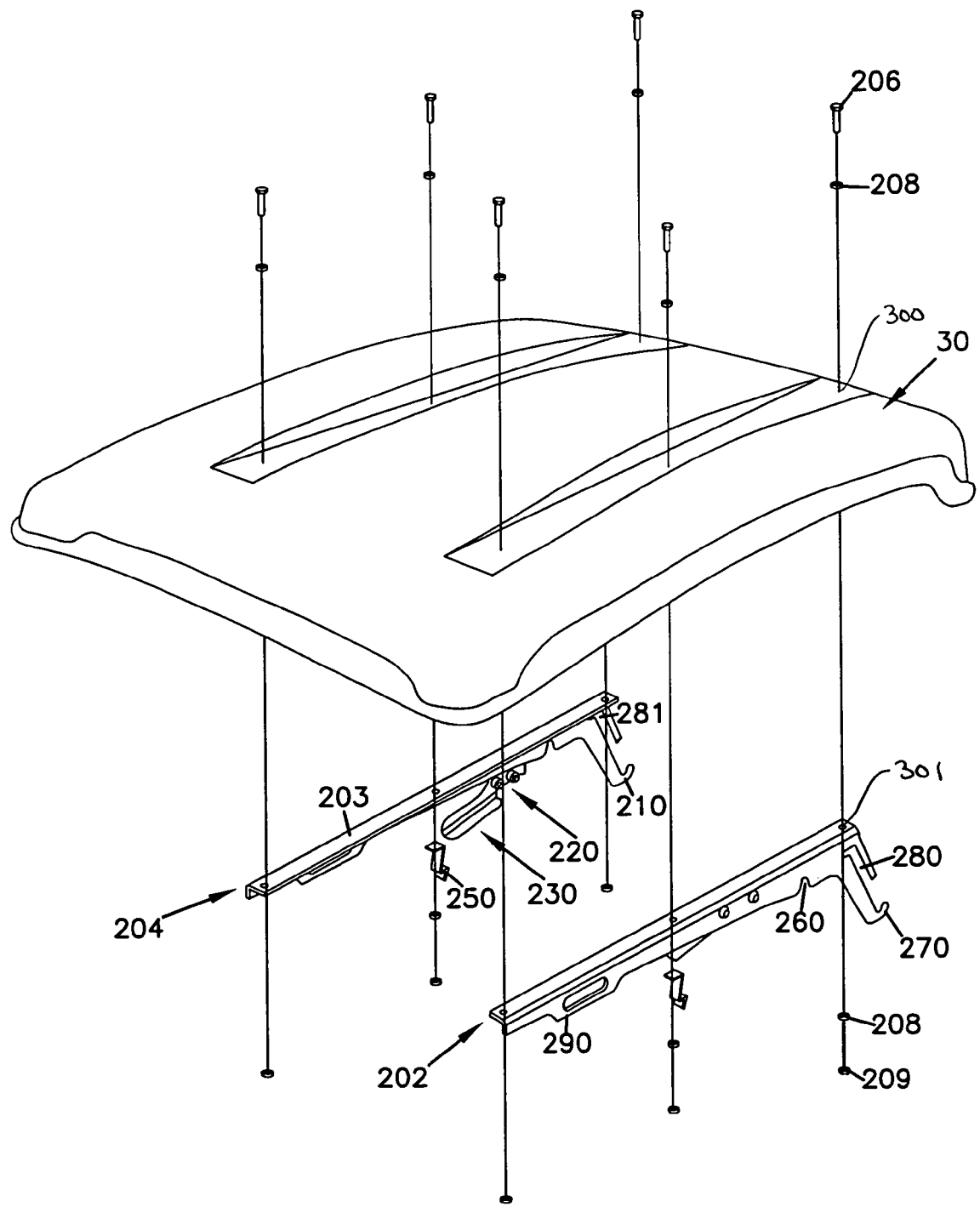
FIG. 3 is an exploded view showing the relationship between the sun shield and the attachment arms of the canopy assembly of FIG. 1.

Referring to FIG. 2, the bracket assembly 100 attaches to the upper rollover protection bar 42 and the attachment arms 204 and 202 (see FIG. 3). The bracket assembly 100 includes a first bracket mounting arm 120, a second bracket mounting arm 130, and a bracket mounting plate 110 extending therebetween, the bracket mounting plate 110 connecting the first bracket mounting arm 120 to the second bracket mounting arm 130. When the canopy 30 is installed, the bracket mounting plate 110 of the bracket assembly 100 is fixed to the upper rollover protection bar 42, the first bracket mounting arm 120 contacts and supports the first attachment arm 204, and the second bracket mounting arm 130 contacts and supports the second attachment arm 202.

The bracket mounting plate 110 also includes a secondary bracket assembly 160. The secondary bracket assembly 160 can include mounting slots 112 and clamp bars 166 that are adapted to receive mounting bolts 168, mounting washers 164, and mounting nuts 162. Installing the mounting bracket assembly 100 can include the steps of positioning the mounting plate 110 on the top side of the upper rollover protection bar 42, positioning the clamp bars 166 on the bottom side of the upper rollover protection bar 42, inserting mounting bolts 168 though the slots 112 in the mounting plate 110 and through the clamp bars 166, and tightening the mounting nuts 162 onto the mounting bolts 168 until the bracket mounting plate 110 is securely attached to the rollover protection bar 40. Note that the bracket mounting plate 110 may include holes 302 or other features to ensure that it does not interfere with other features that may be attached to the upper portion of the rollover protection bar 42.

Figure 7A:
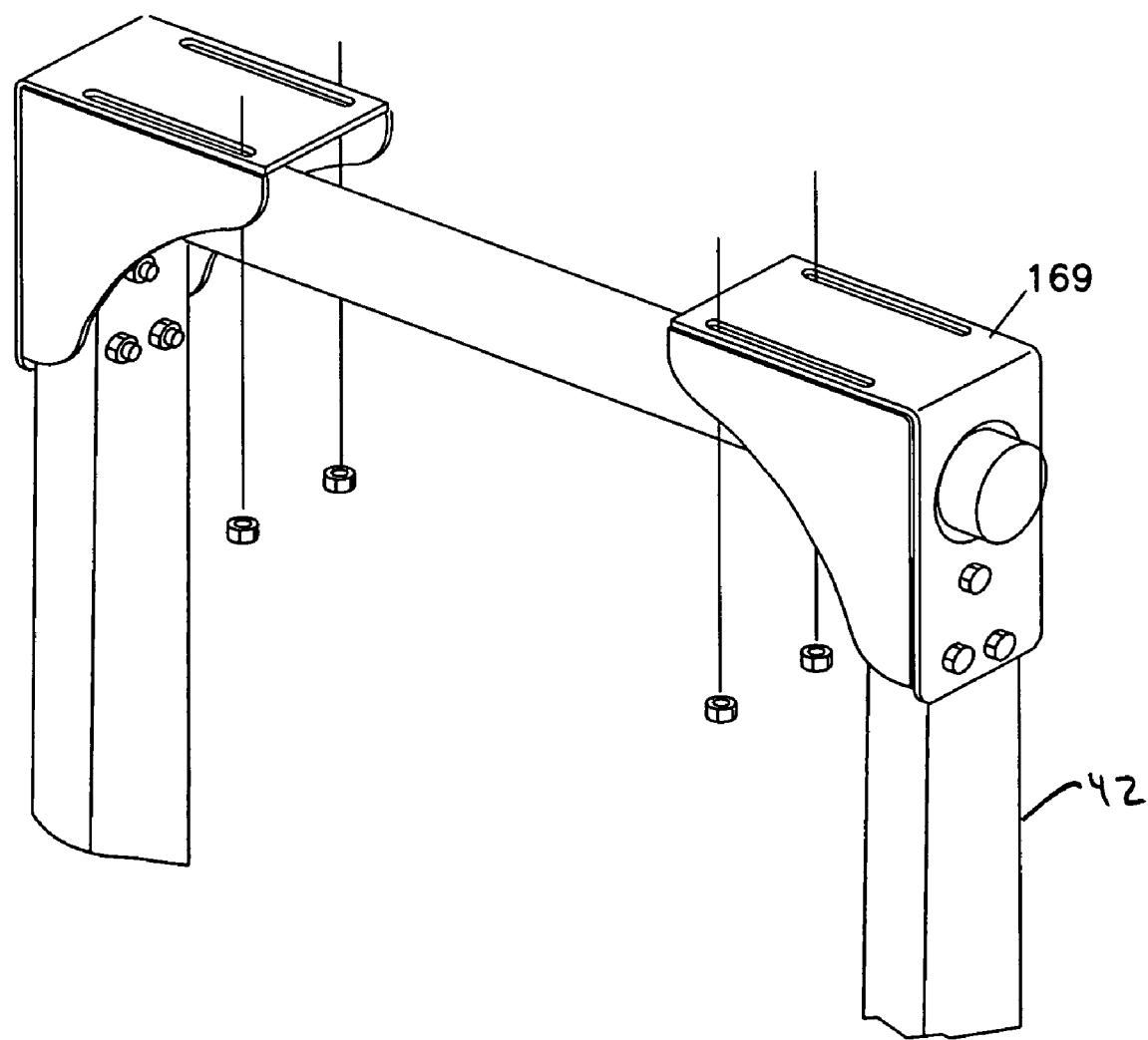
FIGS. 7a, 7b and 7c are perspective views of an alternate embodiment of the secondary bracket assembly of FIG. 2.
Figure 7B:
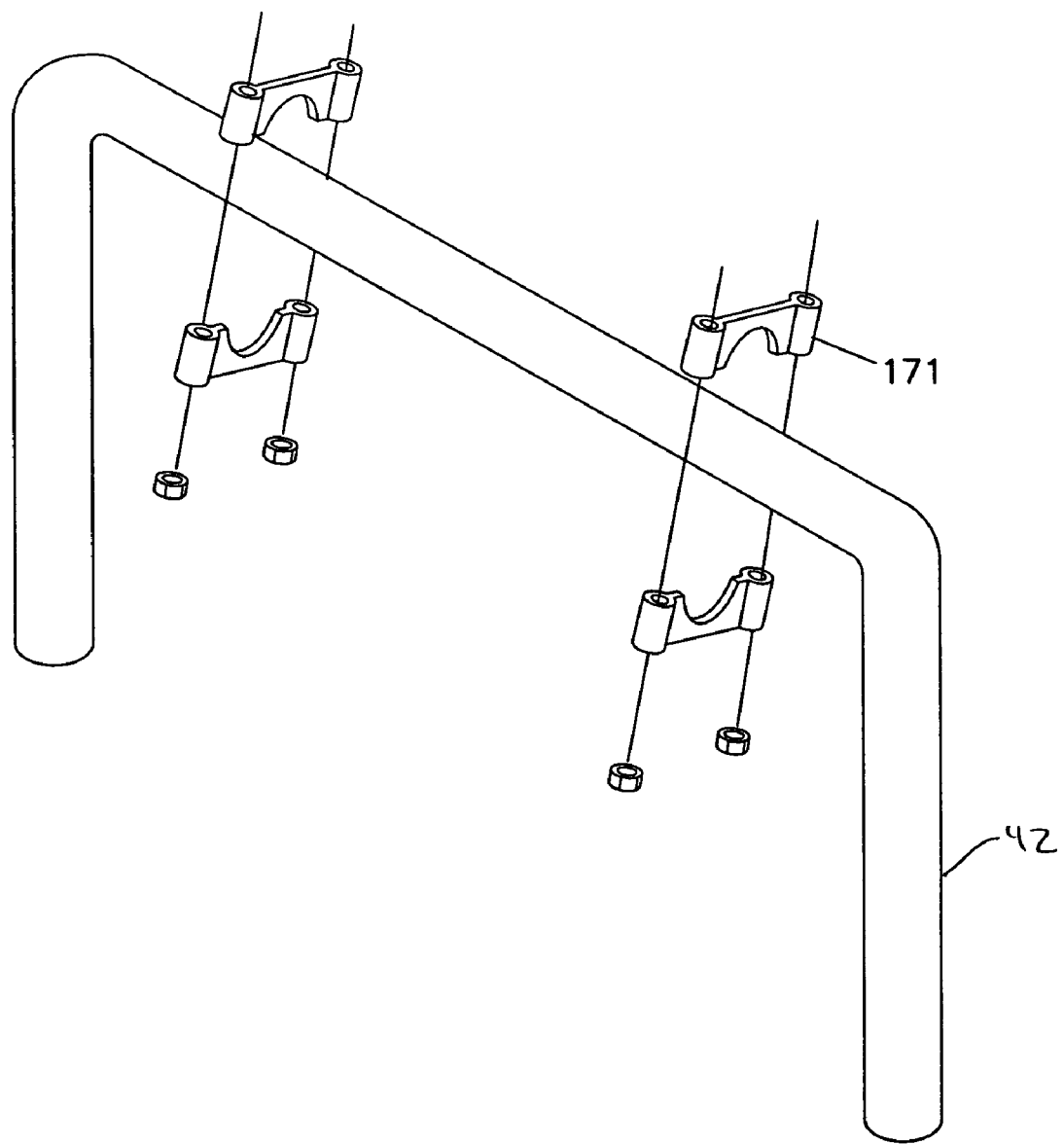
Figure 7C:
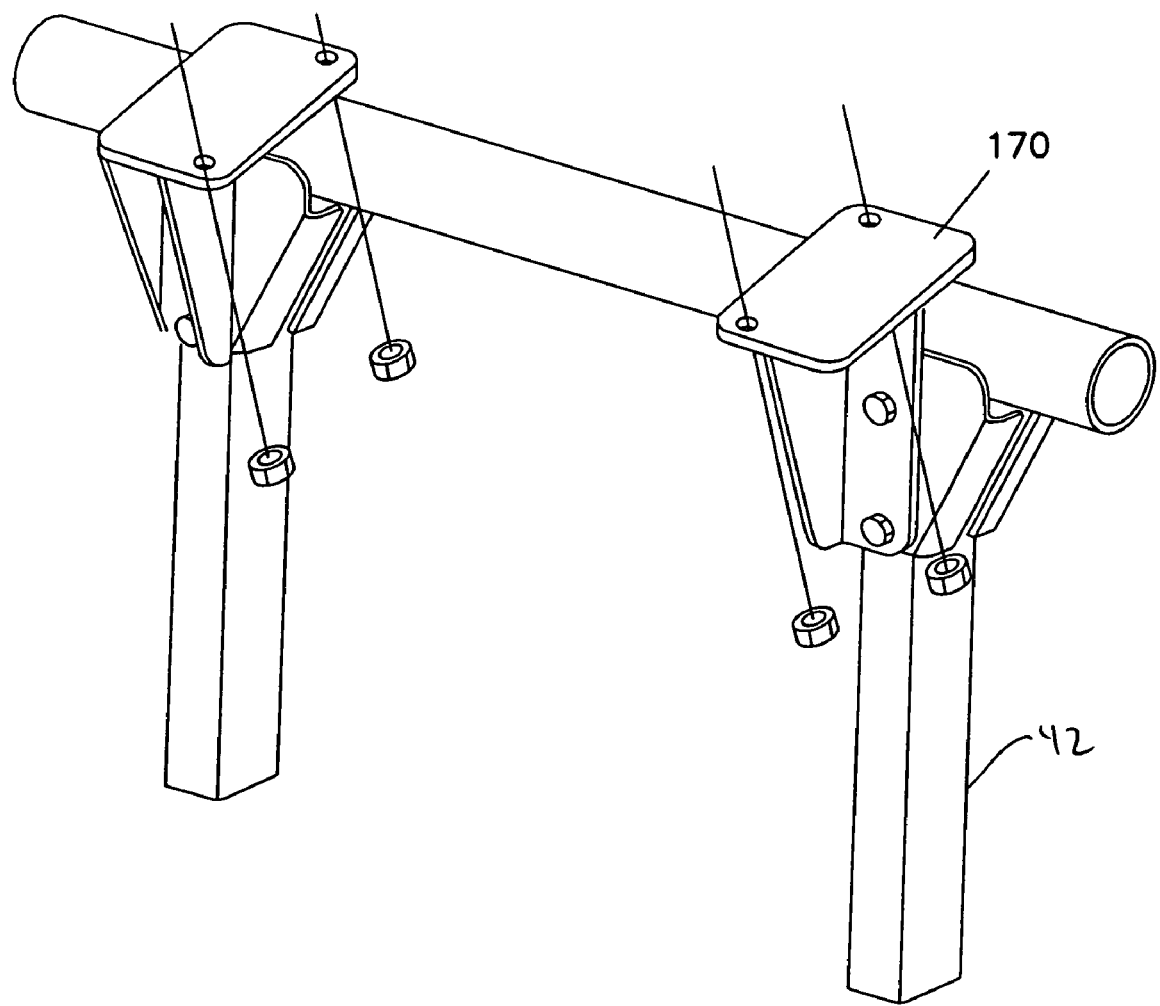

Though the rollover protection bar shown in FIG. 2 has a rectangular cross-section, it should be appreciated that the bracket mounting plate 110 may also be attached to a rollover protection bar that has a non-rectangular cross-section (e.g., a circular cross-section). If the rollover protection bar has a circular cross-section, the secondary bracket assembly 160 can include rollover protection bar mounting brackets 169, 170 and 171 shown in FIGS. 7a, 7b, and 7c respectively. The rollover protection bar mounting brackets 169, 170, and 171 attach to the rollover protection bar and also attach to the bracket mounting plate 110. Though the mounting brackets 169, 170, 171 and the clamp bars 166 both secure the bracket mounting plate 110 to the rollover protection bar 40, they are structurally different. In the embodiment shown in FIG. 2, the rollover protection bar 40 is sandwiched between the clamp bars 166 and the bracket mounting plate 110 (i.e., the clamp bars 166 do not independently attach to the rollover protection bar 40). On the other hand, in the embodiments shown in FIGS. 7a, 7b, and 7c, the mounting brackets 169, 170, and 171 attach independently to the rollover protection bar 40 and the bracket mounting plate 110 attaches to the mounting bracket. In the embodiments shown in FIGS. 7a, 7b, and 7c the mounting brackets 169, 170, and 171 serve as an interface between the bracket mounting plate 110 and the rollover protection bar 40.

It should be appreciated that, in accordance with the invention, the mounting plate 110 can be attached to the rollover protection bar 40 without clamp bars 166 or rollover protection mounting brackets 169, 170, and 171. Alternatives include, but not limited to, welding the bracket mounting plate 110 to the rollover protection bar 40, or drilling holes into the rollover protection bar 40 and bolting the bracket mounting plate 110 directly to the rollover protection bar 40.

The bracket mounting arms 120 and 130 can include at least one contact flange 144 and one bracket catch 150. The contact flange 144 provides structure that interfaces with other elements of the attachment lock assembly 220 that are mounted on the attachment arms 204 or 202. The attachment lock assembly 220 will be discussed in detail below. The bracket catch 150 engages and supports the attachment arms 204 or 202. During installation and removal of the sun shield 30, the bracket catch 150 is adapted to support one end of an attachment arm 204 or 202 while allowing the canopy 30 to be rotated towards, and onto, the bracket assembly 100, or away from, and off of, the bracket assembly 100. The bracket catch 150 is shown in FIGS. 2 and 4 as a protrusion 152. However, it should be understood that the bracket catch 150 can be any structure adapted to engage an attachment arm 204 or 202 and pivotally support one end of an attachment arm 204 or 202.

The bracket mounting arms 120 and 130 can include an angle adjustment mechanism 132. The angle adjustment mechanism 132 may be used to level the sun shield 30 relative to the tractor, but it should be understood that the angle adjustment mechanism 132 can be used to set the sun shield 30 at any preferred angle. The angle adjustment mechanism 132 includes: a first adjustment plate 133, a second adjustment plate 134, and a adjustment mechanism fastener 140 that locks the first adjustment plate 133 to the second adjustment plate 134. The adjustment mechanism fastener 140 includes through cuts 136 that are spaced at a radial distance R from a center hole 138. The through cuts 136 can be constructed to receive a second adjustment plate fastener 142 that holds the second plate 134 at an angle relative to the first adjustment plate 133. Additional through cuts 136 and fasteners 142 can be included to ensure that the angle adjustment mechanism 132 does not unexpectedly come out of adjustment. Note that in the preferred embodiment shown in FIG. 2, one additional though cut 136 and one additional second adjustment plate fastener 142 have been included on each bracket mounting arm 120 and 130.

Referring to FIG. 3, it includes a sun shield 30, a first attachment arm 204, a second attachment arm 202, an attachment lock assembly 220, and engaging members 210. The sun shield 30 can be any structure that is adapted to protect the tractor operator from the elements. In some embodiments the sun shields 30 can be made of fiberglass or opaque plastics so that they are both waterproof and sun proof. The attachment arms 204 and 202 can include two attachment lock assemblies 220, two sun shield arms 203, and two engaging members 210, wherein each lock assembly 220 and each engaging member 210 is mounted on a different attachment arm 204 and 202.

As discussed above, the attachment arms 204 and 202 include sun shield arms 203 that are constructed to interface with the bottom surface of the sun shield 30. The sun shield arms 203 of the attachment arms 204 and 202 can be secured to the sun shield 30 with fasteners 206. Fasteners 206 may include bolts 211, washers 208, and nuts 209 that are engage holes 300 in the sun shield and holes 301 in the sun shield arm 203. In should be understood that the sun shield 30 can be fastened to the attachment arms 204 and 202 in many other ways including, but not limited to, the use of rivets, screws, adhesives, and interference fits.

The attachment arms 204 and 202 include engaging members 210. The engaging members 210 engage the bracket assembly 100 during installation and removal of the sun shield 30. The engaging members 210 enable the attachment arms 204 and 202 to rest on, and pivot off of, the bracket assembly 100. For stability, each attachment arm 204 and 202 can include its own engaging member 210.

The engaging members 210 can include a hook 270 and a slot 280. During installation, the hook is adapted to rest upon the protrusions 152 on the bracket assembly 100, thereby enabling the bracket assembly 100 to support one end of the attachment arms 204 or 202. Then, the attachment arms 204 and 202 can be rotated by the operator towards the bracket assembly 100 until the attachment arms 204 and 202 abut the bracket mounting arms 120 and 130. During the rotation of the attachment arms 204 and 202 towards the bracket assembly 200, the protrusion 152 slides from the hook 270 along the slot 280 to its end position 281. As shown in FIG. 4, the rollover protection bar 40 can be folded over during installation and removal. Folding over the rollover protection bar 40 lowers the upper portion of the rollover protection bar 42 thereby enabling a single operator to more easily install the sun shield 30. Though the engaging members 210 can include a hook 270 and a slot 280, it should be appreciated that the engaging members 210 can be any structure adapted to engage the bracket assembly 100 such that one end of the attachment arms 204 and 202 can rest upon, and pivots on, the bracket assembly 100.

The attachment lock assemblies 220 are mounts to attachment arms 204 and 202 for securing the attachment arms 204 and 202 to the bracket assembly 100. Since the attachment arms 204 and 202 are connected together via the sun shield 30, only one locking assembly is required. However, for added security, it is preferred that both attachment arms 204 and 202 include separate attachment lock assemblies 220.

The attachment lock assembly 220 as shown is an over-center mechanical latch 230. The over-center mechanical latch is mounted on the attachment arms 204 and 202 at lock attachment points 205 and 207. The over-center mechanical latch 230 includes a lever 234, a linkage 236, a plunger 237, a retainer 250, and a retainer fastener 232. The linkage 236 is pivotally connected to the lock attachment point 205 and pivotally connected to the lever 236. The plunger 237 is pivotally connected to the lock attachment point 207 and pivotally connected to the lever 236. The plunger 237 includes an adjustment screw 239 that can be axially extended or retracted to ensure a positive secure contact between the plunger 237 and the contact flange 144 of the bracket mounting arms 120 or 130. The point where the linkage 236 and the lock attachment point 205 connect and the point where the plunger 237 and the lever 234 connect defines a center line 238. The linkage 236 and the plunger 237 are attached to the lever 234 at locations whereby when the lever 234 is in its closed position shown in FIG. 5a, the attachment point between the linkage 236 and the lever 234 is between the center line 238 and the attachment arms 204 or 202, and when the lever 234 is in its open position, the attachment point between the linkage 236 and the lever 234 is on the opposite side of the center line 238. It should be appreciated that the attachment locking assembly 220 can be any mechanism that can secure the attachment arm 202 or 204 to the bracket assembly 100. Other attachment locking assemblies 220 may include, but are not limited to, pins, clamps, hooks, and clips.

The attachment lock assembly 220 can include a retainer otherwise know as a spring lock 250 that ensures that the lock assembly 220 does not open unexpectedly. The retainer 250 is particularly useful when the tractor 15 is driven in high wind conditions, over uneven terrain, or used in other conditions that would cause a great deal of vibrations that might unexpectedly unlock the attachment lock assembly 220. The retainer 250 is position such that when the lever 234 of the over-center mechanical latch 230 is in its closed position, the retainer 250 springs against the lever 234 and prevents the lever 234 from unexpectedly opening, even when jostled. The retainer 250 is attached to the attachment arms 204 or 202 via a retainer fastener 232. The retainer fastener 232 can include, but is not limited to, nut and bolt combinations, rivets, screws, or welds. It should be appreciated that the retainer 250 can be any mechanism that is adapted to prevent the unexpected unlocking of the attachment lock assembly 220. The retainers according to the invention, may include, but are not limited to, straps, pins, clasps, hooks, and clips.

The attachment arms 204 and 202 may further include handles 290. Handles 290 shown in FIGS. 3 and 4 are located on the attachment arms 204 and 202 opposite the engaging members 210. The handles 290 are shown as through cuts in the attachment arms 204 and 202 that are sufficiently large for one to hold onto. It should be appreciated that the handles 290 can be of many other configurations so long as they provide structure that can be conveniently gripped by a human hand.

Figure 6:
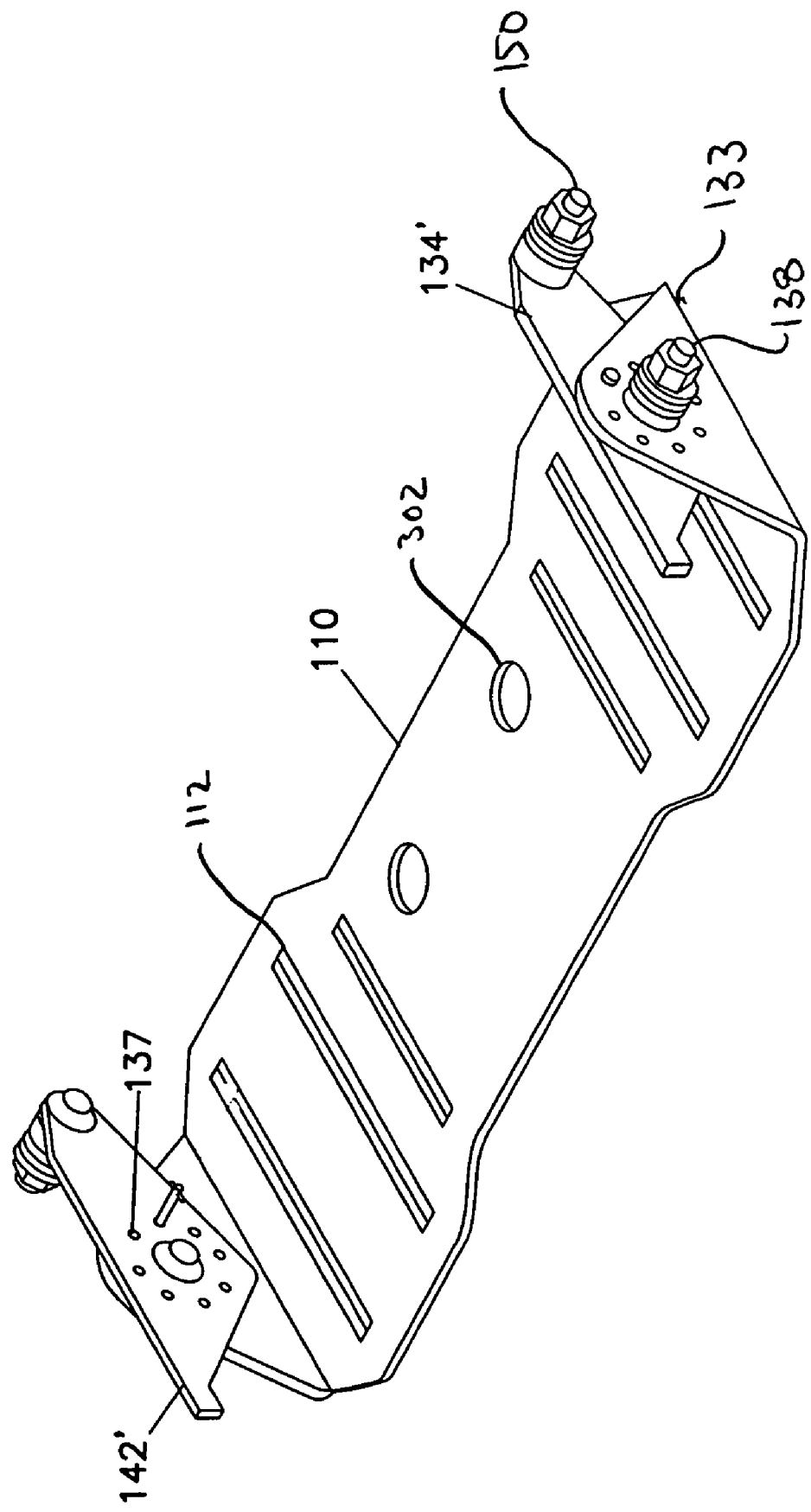
FIG. 6 is a perspective view of an alternative embodiment of the angle adjustment mechanism of the bracket assembly of FIG. 2

Referring to FIG. 6, an alternative embodiment of the adjustment mechanism fastener 140 of the angle adjustment mechanism 132 is shown. In the alternative embodiment the though cuts 136 comprise discrete through holes 137. The alternative embodiment of the adjustment mechanism 131 shown in FIG. 6 works substantially like the embodiment of the adjustment mechanism 132 shown in FIGS. 2 and 4. The alternative embodiment of the angle adjustment mechanism 131 is advantageous because the adjustment mechanism 132 is operable even if the first pate 133 is not firmly pressed against the second plate 134.

In the above specification, examples and data provide a complete description of the manufacture and use of the composition of the invention. Since many embodiments of the invention can be made without departing from the spirit and scope of the invention, the invention resides in the claims hereinafter appended.

We claim:
1. A canopy assembly for use on a tractor comprising:
  (a) a sun shield;
  (b) a bracket assembly comprising:
    a first bracket mounting arm;
    a second bracket mounting arm;
    a bracket mounting plate constructed for attachment to a roll over protection device, the bracket mounting plate extending between the first bracket mounting arm and the second bracket mounting arm;
  (c) a plurality of attachment arms comprising:
    a first attachment arm comprising a sun shield arm for attaching to the sun shield and an engaging member constructed for engaging the first bracket mounting arm; and
    a second attachment arm comprising a sun shield arm for attaching to the sun shield and an engaging member constructed for engaging the second bracket mounting arm, wherein the bracket mounting arms of the bracket assembly comprise an adjustment mechanism for setting a tilt angle of the sun shield.

2. The canopy assembly according to claim 1, wherein the adjustment mechanism comprises a first plate and a second plate, wherein the first plate is provided at a fixed angle relative to the bracket mounting plate, and the second plate is constructed to rotate relative to the first plate.

3. The canopy assembly according to claim 2, wherein the adjustment mechanism further comprising an adjustment mechanism fastener constructed to hold the first plate relative to the second plate.

4. The canopy assembly according to claim 1, wherein the attachment arms further comprise handles.

5. The canopy assembly according to claim 1, wherein the sun shield comprises a fiberglass construction.

6. The canopy assembly according to claim 1, wherein the sun shield comprises a plastic construction.

7. The canopy assembly according to claim 1, wherein each bracket mounting arm of the bracket assembly further includes a bracket catch for engaging a respective one of said attachment arms.

8. The canopy assembly according to claim 1, further comprising an attachment lock assembly for attachment to each attachment arm and each bracket mounting arm.

9. The canopy assembly according to claim 8, wherein each bracket mounting arm comprises a contact flange constructed for engaging an element of the attachment lock assembly.

10. The canopy assembly according to claim 1, further comprising a secondary bracket assembly constructed for attaching the bracket mounting plate to the rollover protection device.

11. The canopy assembly according to claim 10, wherein the secondary bracket assembly comprises a plurality of clamp bars and a plurality of fasteners, and wherein the mounting plate includes a plurality of mounting slots for engaging the plurality of fasteners.

12. A canopy assembly for use on a tractor comprising:
(a) a sun shield;
(b) a bracket assembly comprising:
a first bracket mounting arm;
a second bracket mounting arm;
a bracket mounting plate constructed for attachment to a rollover protection device, the bracket mounting plate extending between the first bracket mounting arm and the second bracket mounting arm;
(c) a plurality of attachment arms comprising:
a first attachment arm comprising a sun shield arm for attaching to the sun shield and an engaging member constructed for engaging the first bracket mounting arm; and
a second attachment arm comprising a sun shield arm for attaching to the sun shield and an engaging member constructed for engaging the second bracket mounting arm, wherein the engaging member of the attachment arms includes a slot that is constructed to slideably engage a respective one of said bracket mounting arms for supporting the sun shield during installation and removal.

13. A canopy assembly for use on a tractor comprising:
(a) a sun shield;
(b) a bracket assembly comprising:
a first bracket mounting arm;
a second bracket mounting arm;
a bracket mounting plate constructed for attachment to a rollover protection device, the bracket mounting plate extending between the first bracket mounting arm and the second bracket mounting arm;
(c) a plurality of attachment arms comprising:
a first attachment arm comprising a sun shield arm for attaching to the sun shield and an engaging member constructed for engaging the first bracket mounting arm; and
a second attachment arm comprising a sun shield arm for attaching to the sun shield and an engaging member constructed for engaging the second bracket mounting arm, wherein the engaging member of the attachment arms includes a hook.

14. A canopy assembly for use on a tractor comprising:
(a) a sun shield;
(b) a bracket assembly comprising:
a first bracket mounting arm;
a second bracket mounting arm;
a bracket mounting plate constructed for attachment to a rollover protection device, the bracket mounting plate extending between the first bracket mounting arm and the second bracket mounting arm;
(c) a plurality of attachment arms comprising:
a first attachment arm comprising a sun shield arm for attaching to the sun shield and an engaging member constructed for engaging the first bracket mounting arm; and
a second attachment arm comprising a sun shield arm for attaching to the sun shield and an engaging member constructed for engaging the second bracket mounting arm;
(d) an attachment lock assembly for attachment to each attachment arm and each bracket mounting arm, wherein the attachment lock assembly comprises an over-center mechanical latch.

15. The canopy assembly according to claim 1, wherein the engaging member of the attachment arms includes a hook.

* * * * *